(12) United States Patent
Patel et al.

(10) Patent No.: US 10,097,449 B2
(45) Date of Patent: Oct. 9, 2018

(54) OPTIMIZED BORDER GATEWAY PROTOCOL BEST PATH SELECTION FOR OPTIMAL ROUTE REFLECTION

(71) Applicant: CISCO TECHNOLOGY, INC., San Jose, CA (US)

(72) Inventors: Keyur Patel, San Jose, CA (US); Serpil Bayraktar, Los Gatos, CA (US); Manish Bhardwaj, San Francisco, CA (US); David Delano Ward, Los Gatos, CA (US); Burjiz Pithawala, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 246 days.

(21) Appl. No.: 14/805,300

(22) Filed: Jul. 21, 2015

(65) Prior Publication Data
US 2016/0248663 A1    Aug. 25, 2016

Related U.S. Application Data

(60) Provisional application No. 62/119,036, filed on Feb. 20, 2015.

(51) Int. Cl.
| | |
|---|---|
| *H04L 12/707* | (2013.01) |
| *H04L 12/721* | (2013.01) |
| *H04L 29/08* | (2006.01) |
| *H04L 12/717* | (2013.01) |

(52) U.S. Cl.
CPC ........... *H04L 45/24* (2013.01); *H04L 45/12* (2013.01); *H04L 45/42* (2013.01); *H04L 67/10* (2013.01)

(58) Field of Classification Search
CPC .......... H04L 45/12; H04L 45/42; H04L 67/10
See application file for complete search history.

(56) References Cited

U.S. PATENT DOCUMENTS

| | | | | |
|---|---|---|---|---|
| 6,148,000 A | * | 11/2000 | Feldman | ............. H04L 12/4608 |
| | | | | 370/394 |
| 6,711,152 B1 | * | 3/2004 | Kalmanek, Jr. | ......... H04L 45/04 |
| | | | | 370/351 |

(Continued)

FOREIGN PATENT DOCUMENTS

| | | |
|---|---|---|
| EP | 1580940 | 9/2005 |
| EP | 1737168 | 12/2006 |

OTHER PUBLICATIONS

Raszuk, et al., "BGP Optimal Route Reflection (BGP-ORR)", IDR Working Group Internet Draftdraft-ietf-idr-bgp-optimal-route-reflection-08, Oct. 22, 2014, 21 pages. https://tools.ietf.org/html/draft-ietf-idr-bgp-optimal-route-reflection-08.

(Continued)

*Primary Examiner* — Ranodhi Serrao

(57) ABSTRACT

Embodiments are provided for optimized best path selection for optimal route reflection and include configuring, by a cloud-based node, a first cluster of nodes in an autonomous system, and determining whether any paths for a network address prefix are available in the first cluster of nodes. Embodiments also include selecting a best path from one or more paths if the one or more paths are determined to be available in the first cluster for the network address prefix. Embodiments further include advertising the best path to one or more nodes in the first cluster. More specific embodiments include determining, if no paths for the network address prefix are available in the first cluster, another path for the network address prefix is available in a second cluster of nodes of the autonomous system, and selecting the other path as the best path.

20 Claims, 5 Drawing Sheets

(56) References Cited

U.S. PATENT DOCUMENTS

| | | | | |
|---|---|---|---|---|
| 7,769,886 | B2* | 8/2010 | Naseh | H04L 45/00 709/238 |
| 8,452,871 | B2* | 5/2013 | Ge | H04L 43/04 709/223 |
| 8,537,840 | B1 | 9/2013 | Raszuk et al. | |
| 9,036,504 | B1* | 5/2015 | Miller | H04L 41/0816 370/254 |
| 9,450,817 | B1* | 9/2016 | Bahadur | H04L 41/0806 |
| 2002/0069278 | A1* | 6/2002 | Forslow | H04L 63/0227 709/225 |
| 2004/0215787 | A1* | 10/2004 | Gibson | H04L 45/00 709/227 |
| 2006/0195607 | A1* | 8/2006 | Naseh | H04L 45/00 709/238 |
| 2007/0091794 | A1 | 4/2007 | Filsfils et al. | |
| 2007/0153782 | A1* | 7/2007 | Fletcher | H04J 3/1617 370/389 |
| 2008/0062861 | A1 | 3/2008 | Shand et al. | |
| 2010/0115604 | A1* | 5/2010 | Gerber | H04L 12/4641 726/15 |
| 2010/0195319 | A1 | 8/2010 | Norniella | |
| 2015/0249573 | A1* | 9/2015 | Miller | H04L 41/0816 709/221 |
| 2016/0248658 | A1 | 8/2016 | Patel et al. | |

OTHER PUBLICATIONS

Raszuk, et al., "BGP Optimal Route Reflection (BGP-ORR)," IDR Working Group, Jul. 2015, 9 pages; https://tools.ietf.org/html/draft-ietf-idr-bgp-optimal-route-reflection-10.

Rekhter, et al., "A Border Gateway Protocol 4 (BGP-4)", IDR, RFC 4271, Jan. 2006, 104 pages; https://tools.ietf.org/html/rfc4271.

Bates, et al., "BGP Route Reflection: An Alternative to Full Mesh Internal BGP (IBGP)", Network Working Group, RFC 4456, Apr. 2006, 12 pages; https://tools.ietf.org/html/rfc4456.

Katz, et al., "Traffic Engineering (TE) Extensions to OSPF Version 2," Network Working Group, RFC 3630, Sep. 2003, 14 pages; https://tools.ietf.org/html/rfc3630.

Pepelnjak, Ivan,"SPF events in OSPF and IS-IS," Mar. 15, 2009, 2 pages; http://wiki.nil.com/SPF_events_in_OSPF_and_IS-IS.

Cisco Systems, Inc., "Intermediate System-to-Intermediate System (IS-IS) TLVs," Document ID: 5739, Aug. 10, 2005, 7 pages; http://www.cisco.com/c/en/us/support/docs/ip/integrated-intermediate-system-to-intermediate-system-is-is/5739-tlvs-5739.html.

PCT May 27, 2016 International Search Report and Written Opinion from International Application Serial No. PCT/US2016/017786; 12 pages.

PCT—Jun. 7, 2016 Partial International Search Report and Opinion from International Application Serial No. PCT/US2016/017909; 6 pages.

\* cited by examiner

OPTIMIZED BORDER GATEWAY PROTOCOL BEST PATH SELECTION FOR OPTIMAL ROUTE REFLECTION

RELATED APPLICATION

This application claims the benefit under 35 U.S.C. § 119(e) of U.S. Provisional Application Ser. No. 62/119,036, filed Feb. 20, 2015, by Keyur Patel, et al., entitled "OPTIMIZED BORDER GATEWAY PROTOCOL BEST PATH SELECTION FOR OPTIMAL ROUTE REFLECTION IN A NETWORK ENVIRONMENT," which is hereby incorporated by reference in its entirety.

TECHNICAL FIELD

This disclosure relates in general to the field of networking, and more particularly, to optimized Border Gateway Protocol (BGP) best path selection for Optimal Route Reflection (ORR) in a network environment.

BACKGROUND

In computer networking, network administrators are often concerned with how to best route traffic flows from one end point to another end point across a network. Routers may be used in an autonomous system (AS) to determine a node to which network traffic propagating through the autonomous system should be forwarded. Routers communicate with other routers within the autonomous system to determine the best paths through the autonomous system to reach a destination address. Various protocols may be used including Border Gateway Protocol (BGP), which is used for routing between autonomous systems, and Internal Border Gateway Protocol (iBGP), which is used for routing between routers in the same autonomous system to external destinations. An Interior Gateway Protocol (IGP) is used for routing inside an autonomous system to internal destinations.

In hot potato routing, packets are not stored (or buffered), but are constantly transferred in an attempt to move the packets to their final destination. Hot potato routing attempts to direct traffic to the closest autonomous system (AS) egress points within a given BGP network. An egress point is an exit point (e.g., a point of presence (POP) or an edge router) of the autonomous system that may be used to reach an external destination node. In a BGP route reflector deployment, the choice of an exit point for a route reflector and its clients will be the egress point closest to the route reflector and not necessarily its clients. Thus, the ability to implement hot potato routing in a BGP route reflection deployment can present significant challenges to network administrators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EMBODIMENTS

Overview

The present disclosure describes an optimized Border Gateway Protocol (BGP) best path selection for optimal route reflection. A method is provided in one example of the present disclosure and includes configuring, by a cloud-based node, a first cluster of nodes in an autonomous system. The method also includes determining whether any paths for a network address prefix are available in the first cluster of nodes. The method further includes selecting a best path from one or more paths if the one or more paths are determined to be available in the first cluster for the network address prefix. The method yet further includes advertising the best path to one or more nodes in the first cluster.

In specific embodiments, the cloud-based node may be a route reflector. In further specific embodiments, the one or more paths may be determined to be available in the first cluster based on reachability information received by the cloud-based node from one or more edge nodes in the first cluster. Further specific embodiments can include determining, if no paths for the network address prefix are available in the first cluster, another path for the network address prefix is available in a second cluster of nodes of the autonomous system, and selecting the other path as the best path.

In further embodiments, the method can include determining, if no paths for the network address prefix are available in the first cluster, two or more other paths for the network address prefix are available in at least a second cluster of nodes of the autonomous system, and selecting the best path from the two or more other paths based, at least in part, on a comparison of metrics for the two or more other paths. The metrics may include one of a cost or a distance of each of the two or more other paths. The method may also include extracting the metrics from one or more protocol messages of an interior gateway protocol (IGP).

In further specific embodiments, one or more border gateway protocol (BGP) sessions can be used by the cloud-based node to advertise the best path to the one or more nodes in the first cluster of nodes. The cloud-based node may be a virtualized route reflector in a cloud network. The best path may be selected from the one or more paths based on policy if the one or more paths include two or more paths. The best path may not be advertised to any node in the first cluster that advertised, to the cloud-based node, reachability information for the network address prefix. A more specific embodiment can include identifying the nodes of the first cluster as clients of the cloud-based route reflector before the first cluster is configured.

Figure 1:
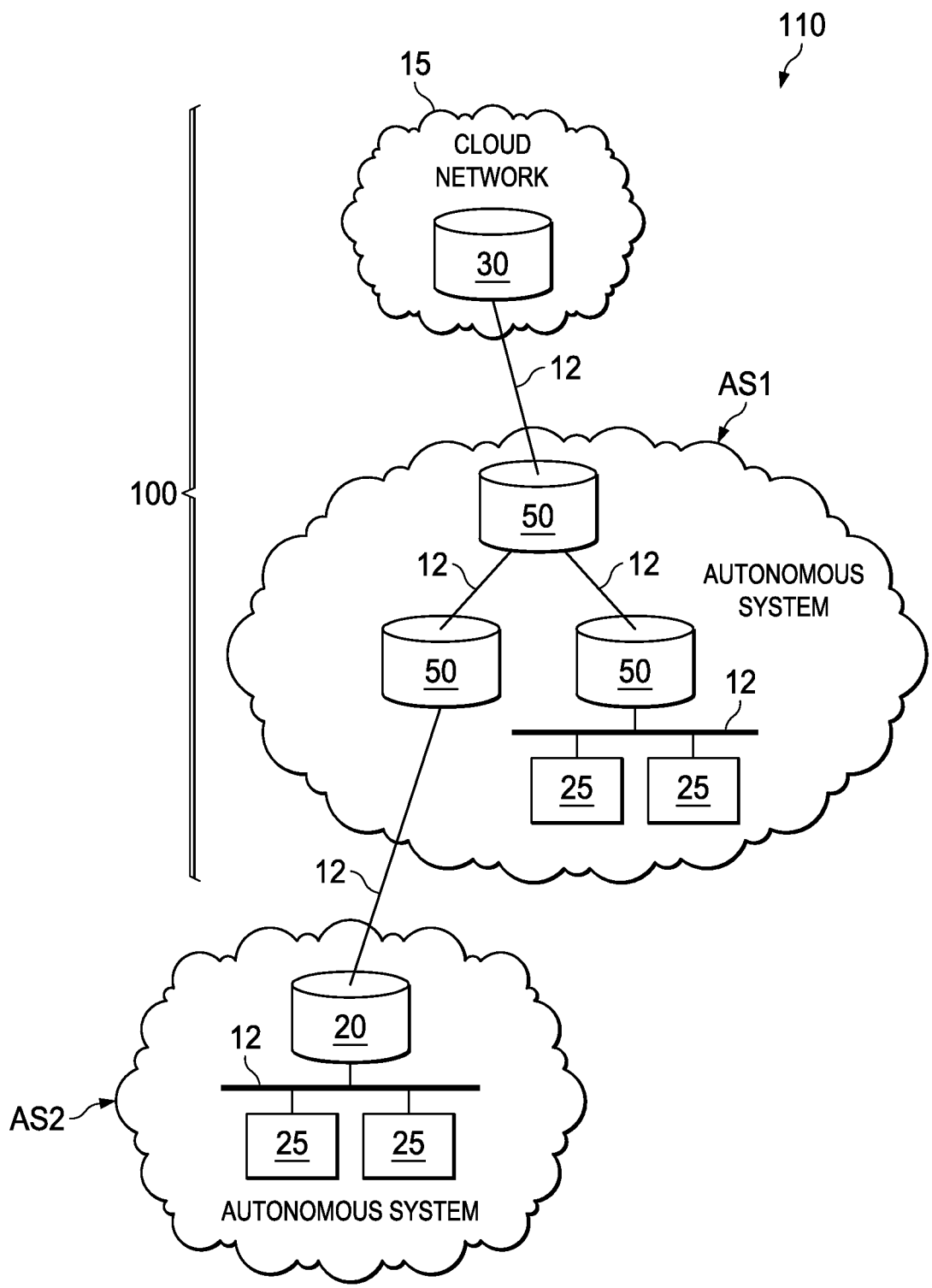
FIG. 1 is a simplified block diagram of a network environment with a communication system for providing optimized best path selection for optimal route reflection in accordance with at least one embodiment of the present disclosure.

Some or all of the elements, operations, and features may be included in respective systems, apparatuses, and devices for performing the described functionality. Furthermore, some or all of the features may be implemented in at least one machine readable storage medium.

Description FIG. 1 is a simplified block diagram of a network environment 110 including a communication system 100 for providing optimized best path selection for optimal route reflection in an autonomous system AS1. Network environment 110 represents a series of points or nodes of interconnected communication paths for receiving and transmitting packets of information that propagate through the network. Network environment 110 offers a communicative interface between nodes, and may include any local area network (LAN), wireless local area network (WLAN), metropolitan area network (MAN), Intranet, Extranet, wide area network (WAN) such as the Internet, cloud network, virtual private network (VPN), or any other appropriate architecture or system that facilitates communications in the network environment. Additionally, network environment 110 may implement a UDP/IP connection and use a TCP/IP communication language protocol in particular embodiments of the present disclosure. Alternatively, any other suitable communication protocol for transmitting and receiving data packets within network environment 110 may be implemented.

Network environment 110 illustrates distributed nodes 20, 30, and 50 being interconnected via communication links 12. Nodes 50 are provisioned in autonomous system AS1 and node 20 is provisioned in an autonomous system AS2. Autonomous systems AS1 and AS2 may be configured as distinct routing domains. Nodes 50 and 20 are network elements, such as routers, that can offer intra-domain routing for electronic data between end nodes 25 within their respective autonomous systems AS1 and AS2. At least some of nodes 20 and 50 can provide inter-domain routing for electronic data between end nodes 25 in autonomous system AS1 and other end nodes 25 in autonomous system AS2. Node 30 is network element, such as a router, and may be provisioned in cloud network 15 as a cloud-based route reflector for AS1. In at least one embodiment, cloud network 15 may be physically remote from autonomous system AS1 and may be accessible over the Internet or other wide area network. Node 30 may be part of the same routing domain as autonomous system AS1. Node 30 cooperates with nodes 50 to enable cloud-based route reflection with optimized best path selection.

End nodes 25 are intended to include devices used to initiate a communication in network environment 110, such as desktops, laptops, servers, appliances, mobile devices, or any other device, component, element, or object capable of initiating voice, audio, video, media, or data exchanges within network environment 110. End nodes can also include any device that seeks to initiate a communication on behalf of another entity or element, such as a program, a database, or any other component, device, element, or object capable of initiating an exchange within network environment 110. It should be noted that FIG. 1 is a representation of possible elements of a communication system for providing cloud-based optimal route reflection with optimized best path selection in an autonomous system. As such, any number of links 12, nodes 20, 30, and 50, and end nodes 25 may be configured in a communication system. For example, some autonomous systems may contain thousands of nodes 50 and an even greater number of end nodes 25 and links 12.

For purposes of illustrating certain example techniques of systems disclosed herein, it is important to understand the communications that may be traversing the network and the protocols used in effecting such communications. The following foundational information may be viewed as a basis from which the present disclosure may be properly explained.

Various routing protocols may be implemented in communication system 100 to enable appropriate routing from autonomous system AS1 to autonomous system AS2. Border Gateway Protocol (BGP) is an example routing protocol that enables inter-domain routing between autonomous systems. An external BGP (eBGP) session provides routing information for routes that allow an autonomous system to reach other autonomous systems. An internal BGP (iBGP) session provides routing information for routes inside an autonomous system to external destinations. BGP is a well known routing protocol defined in Request for Comments (RFC) 4271, by Rekhter, Y., Ed., Li, T., Ed., and S. Hares, Ed., "A Border Gateway Protocol 4 (BGP-4)", RFC 4271, DOI 10.17487/RFC4271, January 2006, http://www.rfc-editor.org/info/rfc4271.

A BGP session can be established when BGP neighbor routers (also referred to herein as 'peer nodes') establish a connection in order to 'speak BGP'. This connection is typically established using a connection-oriented protocol such as Transmission Control Protocol (TCP), which ensures delivery of messages between the connected peer nodes. The connected peer nodes can speak BGP to exchange update messages containing routing information. Update messages are used to update information contained in a routing information base (RIB) of the receiving peer node. An update message can announce a new route or withdraw a previously announced route. Update messages can include various fields such as network layer reachability information (NLRI). NLRI may include Internet Protocol (IP) address prefixes of feasible routes being advertised in the update message. Conversely, a field for withdrawn routes may include IP address prefixes for routes being withdrawn because they are no longer reachable. A route is a unit of information that pairs a set of destinations with attributes of a path to those destinations. A path can be defined by one or more attributes and is generally intended to mean the route between two points in a network, such as an autonomous system. IP addresses taken from an IPv4 or IPv6 pool can be divided into two parts including a network section and a host section. The network section identifies a set of destinations and is referred to as the prefix. A prefix in a destination address is used by a routing protocol to render a routing decision for the next hop in the path. A prefix may also be referred to as a 'routing prefix'.

An autonomous system can use iBGP to advertise reachability information for network address prefixes of destinations (e.g., routers) outside the autonomous system. To implement iBGP, however, a full mesh is required in which every router within the autonomous system is connected to every other router via a connection such as TCP. This full mesh requirement can severely limit scalability of an autonomous system running iBGP sessions.

In BGP networks, route reflection is often desirable because a full mesh implementation can be avoided. Route reflector deployments can result in a significant reduction of the number of iBGP sessions needed in the network. Route reflection is a well-known routing protocol defined in Requests for Comment (RFC) 4456, Bates, T., Chen, E., and R. Chandra, "BGP Route Reflection: An Alternative to Full Mesh Internal BGP (IBGP)", RFC 4456, DOI 10.17487/RFC4456, April 2006, http://www.rfc-editor.org/info/rfc4457.

A route reflector (RR) is a network element used in a BGP network to implement route reflection. In a BGP route reflection deployment, one or more routers are designated as route reflectors and are allowed to accept and propagate iBGP routes to their clients. The designated route reflectors can be fully meshed with iBGP peering sessions between the route reflectors. Each route reflector can peer with multiple routers, which may be referred to herein as route reflector clients ('RR-clients') or clients. In some implementations, the clients of each route reflector form a cluster of routers to which the route reflector is connected. A cluster of routers can be connected via iBGP through their shared route reflector. A route reflector can propagate the routing information it receives from other route reflectors to its client routers, and can propagate routing information for its client routers to other route reflectors. Thus, the number of sessions needed in a BGP network can be greatly reduced.

In hot potato routing, a router (e.g., route reflector) attempts to render a best path routing decision that directs network traffic to an autonomous system (AS) egress point, within a given BGP network, that is closest to the router rendering the decision. Typically, a route reflector selects the best path based on an interior gateway protocol (IGP) metric computed from its IGP database and announces this path to its client BGP speakers. A metric is the quantitative value used to measure the distance to a given network. For hot potato routing, the best path to a network is the path with the lowest metric.

A route reflector may be embodied as any type of router, including a border or edge router deployed on the perimeter of an autonomous system or as a distributed router in a cloud network, for example. Although route reflectors are usually located in the forwarding path within a cluster (e.g., at the point of presence (POP) boundaries) and stay congruent with the actual topology of the network, virtual route reflectors (vRRs) and possibly other route reflectors may be placed outside of clusters. For example, ring topologies, make it difficult to form route reflector clusters naturally, and tunneled applications, such as Layer 3 Virtual Private Networks (L3VPNs), do not necessarily need route reflectors to be in the forwarding path. In addition, distributed route reflectors may serve as path aggregation points on the network in order to reduce distribution of BGP information to edge routers that may have limited CPU and memory.

Hot potato routing becomes problematic for route reflectors that are not in an optimal forwarding path, including centralized route reflectors such as vRRs. Route reflectors that are not in an optimal forwarding path, or that are placed in such a way in the network that is not congruent with the topology of the network, can lose their ability to advertise a best path to achieve hot potato routing to their clients. Because the choice of an exit point for a route reflector and its clients is the egress point closest to the route reflector, in BGP route reflector deployments where route reflectors are not in a forwarding path, the chosen egress point may not necessarily be the closest egress point to the route reflector clients (RR-clients). Consequently, the best path routing decision rendered by the route reflector and advertised to the RR-clients may not be the best path (e.g., with optimal metrics) to the destination. Thus, deployment of route reflectors may be constrained to appropriate cluster boundaries or at an appropriate central location that facilitates optimum hot potato routing.

BGP Optimal Route Reflection (BGP-ORR) allows route reflectors to operate from a cloud environment without compromising hot potato routing. BGP-ORR requires route reflectors (RRs) to associate their RR-clients with an optimal route reflector (ORR) root address as part of BGP-ORR functionality. An ORR root address is an address in the network where IGP SPFs (Interior Gateway Protocol Shortest Paths First) are rooted to compute Shortest Path First (SPF) topology. BGP-ORR is a routing protocol defined in Inter-Domain Routing Working Group Internet Draft, by Raszuk, R., Cassar, C., Aman, E., Decraene, B., and S. Litkowski, "BGP Optimal Route Reflection (BGP-ORR)", draft-ietf-idr-bgp-optimal-route-reflection-08, Oct. 22, 2014, https://tools.ietf.orehtml/draft-ietf-idr-bgp-optimal-route-reflection-08.

BGP-ORR requires route reflectors to announce a customized BGP best path to its RR-clients. In order announce the customized best path, route reflectors may do the following: 1) store an IGP database as if it was rooted on the RR-clients, and 2) run a best path algorithm multiple times, once per each client. Storing the IGP database as if it was rooted on the RR-clients may require significant memory and CPU resources. Running the best path algorithm for each individual client may also utilize significant CPU resources. As a network scales upwardly, this can become even more problematic.

At least one embodiment of the present disclosure can resolve aforementioned issues (and more) associated with determining and selecting a best path in autonomous systems that are partitioned into multiple clusters with their own IGP domains. Embodiments in the present disclosure may be provided in a network running BGP-ORR, in which route reflection is implemented in a virtual or physical router in a cloud network. According to at least one embodiment, a cloud-based route reflector of the present disclosure can identify clusters within the autonomous system and can run best path computations once per each cluster. IGP metric values can be stored in a cluster/RR-client based storage such as a database or routing information base (RIB) table of the cloud-based route reflector. The best path computations may be performed using the appropriate database or RIB table. In at least one embodiment, cloud-based route reflectors automatically prefer intra-cluster client paths over inter-cluster paths, which may be represented as eBGP>intracluster>intercluster. When an intra-cluster path is not available, a comparison may be performed of inter-cluster paths using the IGP cost from inter-area link state advertisements (LSAs) injected within a cluster/area domain by area border routers (ABRs) located at the cluster boundaries. This allows route reflectors to be moved out of the forwarding path without compromising the hot potato routing within a BGP network. Also, BGP route advertisement may be configured to advertise to clients in a cluster the best path computed for a given cluster.

Several advantages are provided by a cloud-based route reflector that identifies clusters within an autonomous system and computes best paths per cluster. First, implementation of a route reflector in a cloud facilitates quick deployment. In addition, the use of memory and CPU resources on cloud-based route reflectors can be reduced, and the system can be more easily scaled. Moreover, such a solution avoids the need to alter existing deployments of route reflectors. Existing route reflectors (deployed in the cloud or not) can serve as optimal route reflectors for multiple clusters rather than a single cluster of which it is a member.

Figure 2:
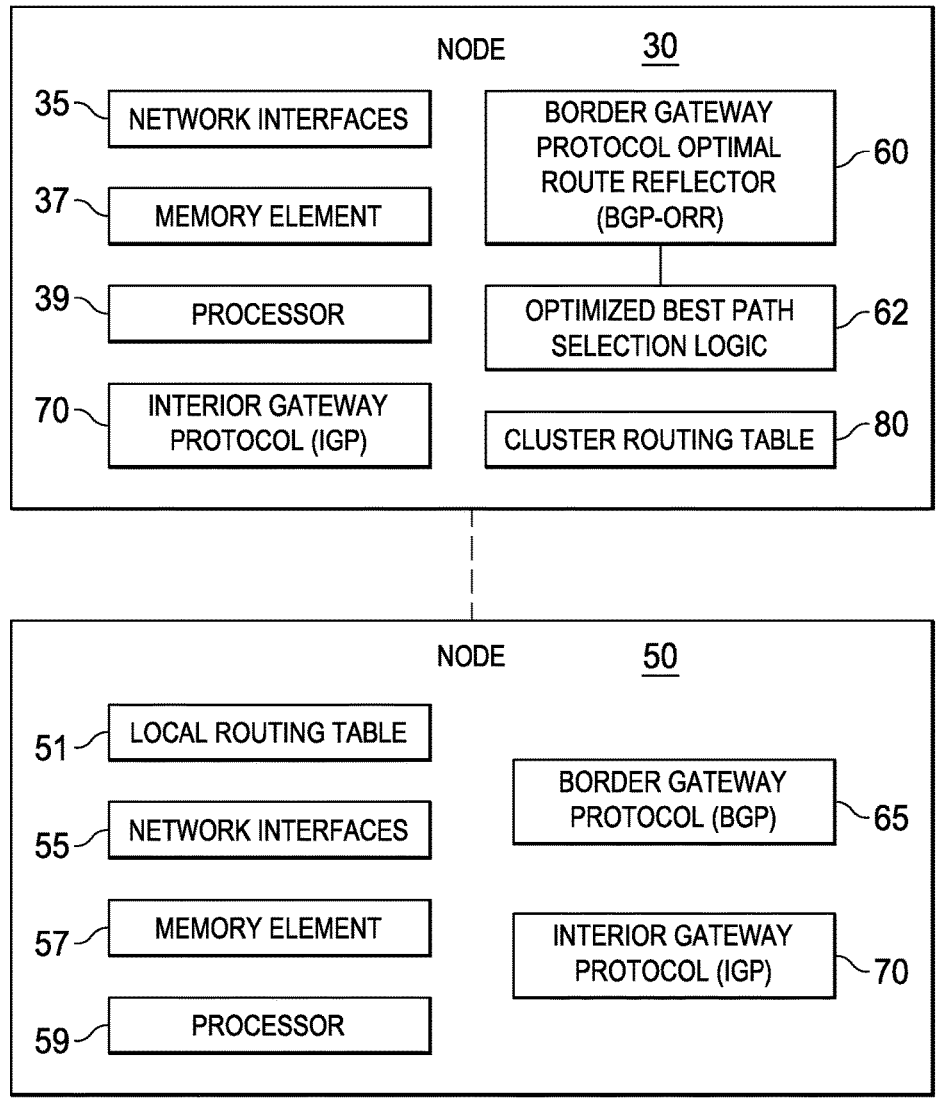
FIG. 2 is a simplified block diagram illustrating possible details associated with example nodes in the communication system according to at least one embodiment.

Turning to FIG. 2, FIG. 2 is a simplified block diagram of possible embodiments of node 30 and nodes 50, as shown in FIG. 1. Nodes 30 and 50 may include, respectively, multiple network interfaces 35 and 55, at least one memory element 37 and 57, and at least one processor 39 and 59. Processors 39 and 59 may be operably coupled to respective network interfaces 35 and 55, which include suitable transmitting and receiving components for communicating over communication links 12 in network environment 110. Furthermore, nodes 30 and/or 50 may be implemented in physical or virtualized environments or a suitable combination thereof.

Routing protocols can be implemented in nodes 30 and 50 to achieve the optimized best path determinations. Border gateway protocol optimized route reflector (BGP-ORR) 60 with optimized best path selection logic 62 can be implemented in node 30. Border gateway protocol (BGP) 65 can be implemented in node 50. Interior gateway protocol (IGP) 70 can be implemented in nodes 30 and 50. BGP communications may be transmitted and received between node 30 and its clients (e.g., node 50) via a transmission protocol such as TCP/IP. In at least one embodiment, BGP-ORR 60 of node 30 also includes optimized best path selection logic 62 for computing best paths through autonomous system AS1 to reach external destinations such as autonomous system AS2. A network connection can be established between node 50 and node 30 to speak BGP and exchange routing information that can be used to route data from internal nodes of autonomous system AS1 to external destinations.

Data associated with embodiments described herein may be stored in memory elements 37 and 57 of nodes 30 and 50, respectively, in at least one embodiment. In node 30, the data may include, but is not limited to, a cluster routing table 80. Cluster routing table 80 can include IGP metrics (e.g., a cost) for each BGP next hop, which can be measured from designated nodes referred to as 'root nodes'. Also cluster routing table 80 (or some other suitable storage structure) may include reachability information for network address prefixes advertised by clients of node 30. In at least one embodiment, cluster routing table 80 may be implemented as a routing information base (RIB) table, which can include routing information for all routing protocols running in communication system 100.

In node 50, stored data may include a local routing table 51 that includes routing information to enable node 50 to route network traffic within autonomous system AS1 and possibly to external destinations. In particular, local routing table 51 may contain best path information for network address prefixes, after the best paths are selected and advertised by node 30. Contents of local routing table 51 can depend, at least in part, on its location within autonomous system AS1. For example, routing information may vary based on a cluster of routers to which a node is assigned. A best path for a particular prefix stored in a router of one cluster may vary with respect to a best path for the same prefix stored in another router of another cluster in the same autonomous system.

Figure 3:
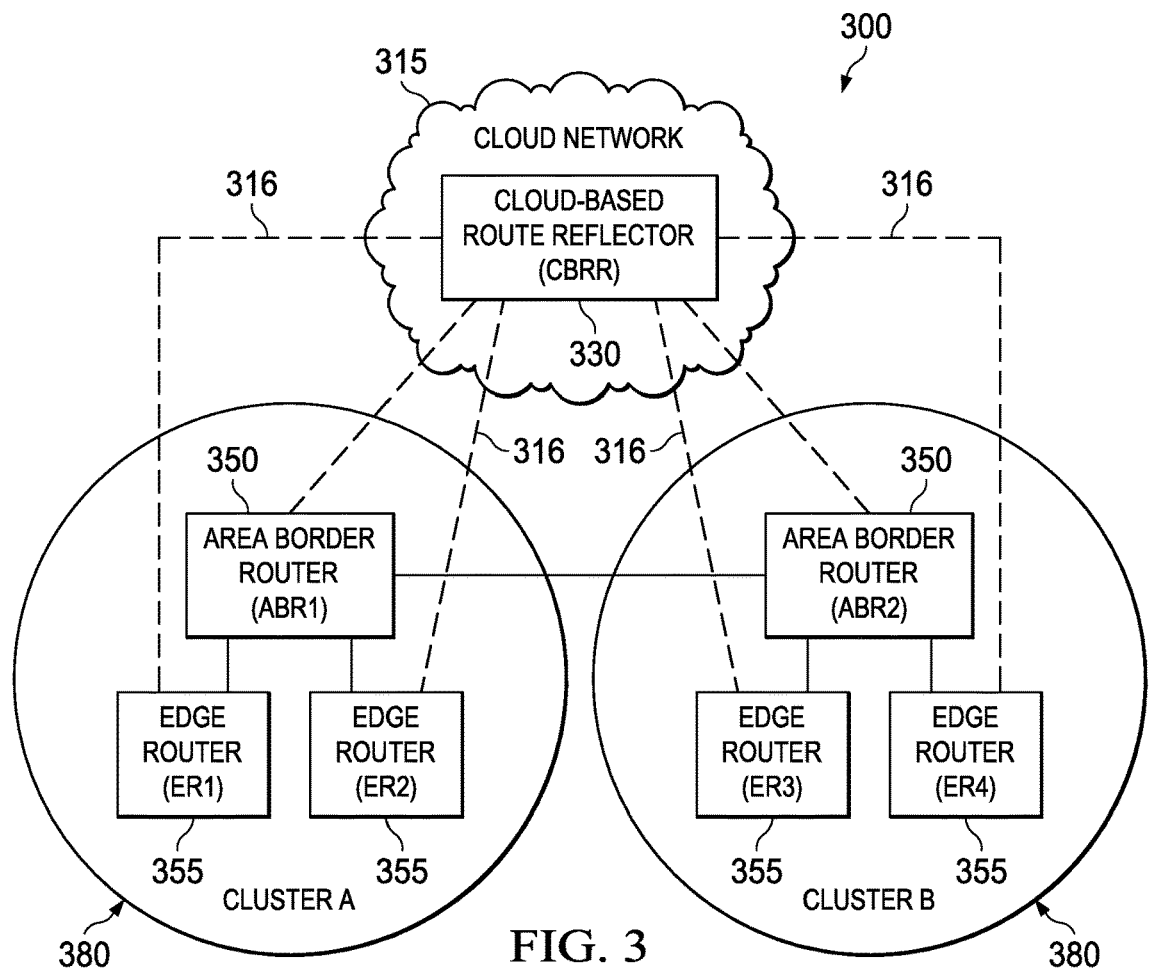
FIG. 3 is a simplified block diagram of a possible configuration of a communication system according to at least one embodiment.

FIG. 3 is a block diagram illustrating a possible configuration of a communication system 300 for providing optimized best path selection for optimal route reflection in an autonomous system. Nodes in the autonomous system are partitioned into two clusters 380 (e.g., cluster A and cluster B). The nodes in cluster A include an area border router 350 (e.g., ABR1) and edge routers 355 (e.g., ER1 and ER2). The nodes in cluster B include another area border router 350 (e.g., ABR2) and other edge routers 355 (e.g., ER3 and ER4). Edge routers 355 may represent autonomous system border routers (ASBRs), customer edge routers (CEs), provider edge routers (PEs), and any other node provisioned at an edge, or perimeter, of the autonomous system that can participate in BGP sessions with cloud-based route reflector 330 (e.g., CBRR) in cloud network 315. Other nodes (not shown), such as internal routers, may also be provisioned in the clusters.

Area border routers ABR1 and ABR2 represent routers located near a border of one or more areas of an Interior Gateway Protocol (IGP). IGPs are routing protocols for exchanging routing information between routers within an autonomous system for internal destinations. Examples of IGP include Open Shortest Path First (OSPF) and Intermediate System-to-Intermediate System (IS-IS). In communication system 300, each cluster may have its own IGP domain (e.g., an area for OSPF or a level for IS-IS). Generally, an area/level of an IGP is a routing group of an autonomous system that can be smaller than the autonomous system. In at least some embodiments, IGP routing groups correspond to clusters of communication system 300. In other implementations, however, clusters may not have one-to-one correspondence with routing groups. ABR1 and ABR2 can each provide an ingress and egress point for network traffic flowing to nodes within their respective routing groups or flowing from their respective routing groups to nodes in other routing groups within the autonomous system. In some implementations, however, IGP may have a single flat area. For ease of illustration, in this example, clusters A and B correspond to distinct IGP areas. Thus, ABR1 and ABR2 can perform data path forwarding between clusters A and B in this example.

IGP neighbors (two routers with a common link) may form an adjacency to exchange routing protocol packets. A routing protocol packet communicated by a router can contain the router's local routing topology including, for example, a router ID, the router's IP address, links to other routers within the router's area, and route metrics for each of the links. Link state advertisements (LSAs) and link state packets (LSPs) are routing protocol packets that are used to communicate in OSPF and IS-IS, respectively. For ease of illustration, embodiments described herein generally refer to 'link state advertisements' (or 'LSAs') and 'areas', which are used in OSPF. It will be apparent however, that the embodiments disclosed herein can be applied to any other suitable IGPs including, but not limited to IS-IS. In IS-IS, routing protocol packets are referred to as 'link state packets' (or 'LSPs'), and routing groups are referred to as 'levels'.

In an IGP, each router has its own unique router ID. By way of example, OSPF can set a router ID by configuring an IP address on a loopback interface of the router. In IS-IS, the router ID (or system ID) can be configured by an administrator in various suitable ways (e.g., IP address of loopback interface, Media Access Control (MAC) address, sequential numbering, etc.).

Cloud-based route reflector (CBRR) 330 includes route reflection capabilities. Edge routers ER1, ER2, ER3, and ER4 and area border routers ABR1 and ABR2 are clients of CBRR 330. CBRR 330 may be a virtualized or physical router in cloud network 315. CBRR 330 is not in the forwarding path of the autonomous system and therefore, can run BGP-ORR 60 with optimized best path selection logic 62 and be configured to receive and send control plane information only.

In operational terms, and in terms of one particular embodiment, IGP can advertise router information to CBRR 330 for each node in the autonomous system (e.g., ABR1, ABR2, ER1, ER2, ER3, and ER4). CBRR 330 can identify ER1, ER2, and ABR1 as clients and can group them in cluster A. CBRR 330 can identify ER3, ER4, and ABR2 as clients and can group them in cluster B. Various approaches may be utilized to group the nodes into clusters including, for example, manually configuring the clusters or using information from existing protocols (e.g., BGP, IGP) to identify clients and group the clients into clusters. In at least some embodiments, a cluster identifier, which is a BGP attribute, may be used by CBRR 330 to determine which nodes are in the same cluster. In other embodiments, clusters can correspond to IGP areas (or levels) and thus, clusters can also be configured based on an IGP area membership. In yet further embodiments, clusters may be manually configured.

In the embodiment of FIG. 3, edge routers ER1, ER2, ER3, ER4, and area border routers ABR1 and ABR2 are clients of CBRR 330 and each one can establish a connection or BGP session 316 (e.g., TCP connection) with CBRR 330 in order to speak BGP. In BGP sessions 316, edge nodes ER1-ER4 can provide update messages to CBRR 330 to advertise network layer reachability information (NLRI). NLRI advertised by ER1, for example, can include IP prefixes of network addresses to which ER1 can route network traffic it receives. Other routers within clusters A and B that are not edge routers (e.g., interior routers) may also establish BGP sessions with CBRR and send update messages. These interior routers, however, may not advertise reachability to any external destinations. In some scenarios, multiple edge nodes can advertise routes for the same prefix. In this scenario, CBRR 330 can see multiple paths to the prefix.

In at least one embodiment, for each network address prefix, CBRR 330 selects a best path per cluster in the autonomous system. The selected best paths may vary between clusters. For a particular prefix, CBRR 3300 can advertise a best path selected for a cluster to clients within that cluster. The clients receiving the advertisement can use the best path information to route traffic toward external destinations associated with the prefix. For example, a best path selected for clients in cluster A to reach network address prefix 1.1.1.1/24, can be advertised by CBRR 330 in BGP sessions established with clients (e.g., ER1, ER2, ABR1) in cluster A. The clients in cluster A can use the best path information to route traffic toward external destinations associated with the 1.1.1.1/24 network address prefix.

In at least one embodiment, when selecting a best path for a particular cluster, CBRR 330 can automatically prefer a path within the cluster (i.e., intra-cluster path) over paths associated with other clusters (i.e., inter-cluster path). If more than one intra-cluster path has been advertised, then CBRR 330 can use any suitable tie-breaking policies including, but not limited to selecting a best path based on IGP metric comparisons, selecting a best path associated with a lowest (or highest) edge router identifier (ID), or selecting a best path based on parameters of the edge routers (e.g., CPU load, capacity, etc.).

If an intra-cluster path for a prefix is not available in a particular cluster, CBRR 330 may compare inter-cluster paths for the prefix, which are advertised by edge nodes in other clusters. In at least one embodiment, CBRR 330 can use IGP metrics (e.g., cost) carried in IGP advertisements for the comparison. For example, a link-state advertisement (LSA) originated by an edge node and sent to CBRR 330 can include the cost of a path being advertised. This cost may be injected in the LSA by an area border router of the cluster before the LSA is forwarded to CBRR 330. The edge node and area border router may be grouped as a different cluster than the particular cluster for which CBRR 330 is attempting to find a best path for the prefix. It should be noted that, in at least some embodiments, a cost of reaching ABRs from CBRR 330 is not considered when comparing the cost of available inter-cluster paths.

Figure 4:
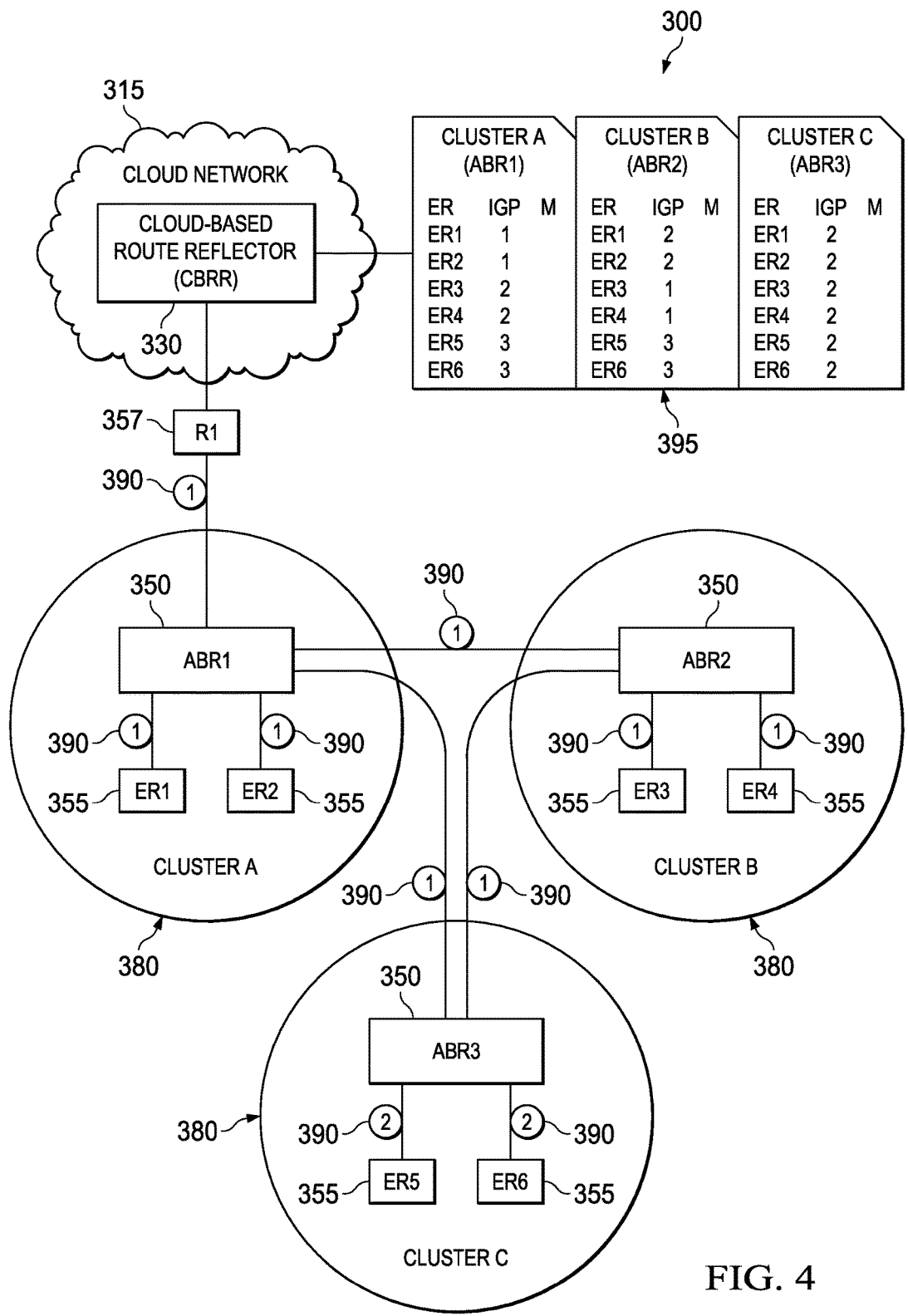
FIG. 4 is a simplified block diagram showing additional possible elements and details of the communication system of FIG. 3.

FIG. 4 is a simplified block diagram illustrating additional elements and clusters of communication system 300. As shown in FIG. 4, communication system 300 may further include additional nodes partitioned in a third cluster 380 (e.g., cluster C). Cluster C includes an area border router 350 (e.g., ABR3) and edge routers 355 (e.g., ER5 and ER6). Other nodes (not shown), such as interior routers, may also be provisioned in cluster C. Communication system 300 may further include a node embodied as a router 357 (e.g., R1) between cloud-based route reflector (CBRR) 330 and ABR1.

Additional elements are shown in FIG. 4 including a cluster routing table 395, which can be maintained by CBRR 330. In at least one embodiment, cluster routing table 395 is configured as a routing information base (RIB) and may include routing information associated with prefixes of external network addresses. This routing information can be advertised by edge nodes ER1-ER6 in communication system 300. Cluster routing table 395 can include the routing information per cluster for every cluster in the autonomous system.

Routing information in cluster routing table 395 may include, but is not limited to, router IDs and IGP metrics (e.g., cost, distance) that enable optimum path selection for clients (e.g., ER1-ER6) of CBRR 330. The IGP metrics stored in cluster routing table 395 may be measured from a root node of a cluster (e.g., ABR1, ABR2, ABR3) to a client within the cluster (e.g., ER1-ER6). Example IGP costs for each hop between nodes in communication system 300 are indicated at 390. IGP next hop costs 390 are used to calculate IGP costs that are stored in cluster routing table 395. For example, as shown in Cluster A information of cloud routing table 395, the costs from ABR1 to ER1 and to ER2 is 1 each, because each path traverses one hop having a cost of 1. The costs from ABR1 to ER3 and to ER4 are 2 each, because each path traverses two hops and each hop has a cost of 1. The costs from ABR1 to ER5 and to ER6 are 3 each, because each path traverses two hops, where one hop has a cost of 1 and the other hop has a cost of 2.

In accordance with embodiments disclosed herein, when CBRR 330 is selecting a best path for a cluster, IGP metrics may be considered in at least some scenarios. For example, when multiple intra-cluster paths are identified for a particular cluster, in at least one embodiment, a tie-breaking policy that indicates which path to select may be based on IGP metrics. One possible policy could require the path with the lowest IGP metric to be selected. In the example of FIG. 4, however, each edge router within a cluster has the same cost. Thus, another tie-breaking policy may be used in this scenario (e.g., lowest/highest router ID, parameters of the edge routers, etc.).

In another example, when a cluster does not have an intra-cluster path, inter-cluster paths may be compared to determine which path offers the lowest cost. For example, assume ER3 and ER5 advertise the same network address prefix to CBRR 330. A best path computation can include comparing the routes of ER3 and ER5 from the perspective of the root node ABR1 of cluster A. The best path computation can indicate that ER3 has a cost of 2 from ABR1, while E5 has a cost of 3 from ABR1. Accordingly, E3 may be selected as the best path for the network address prefix.

Figure 5:
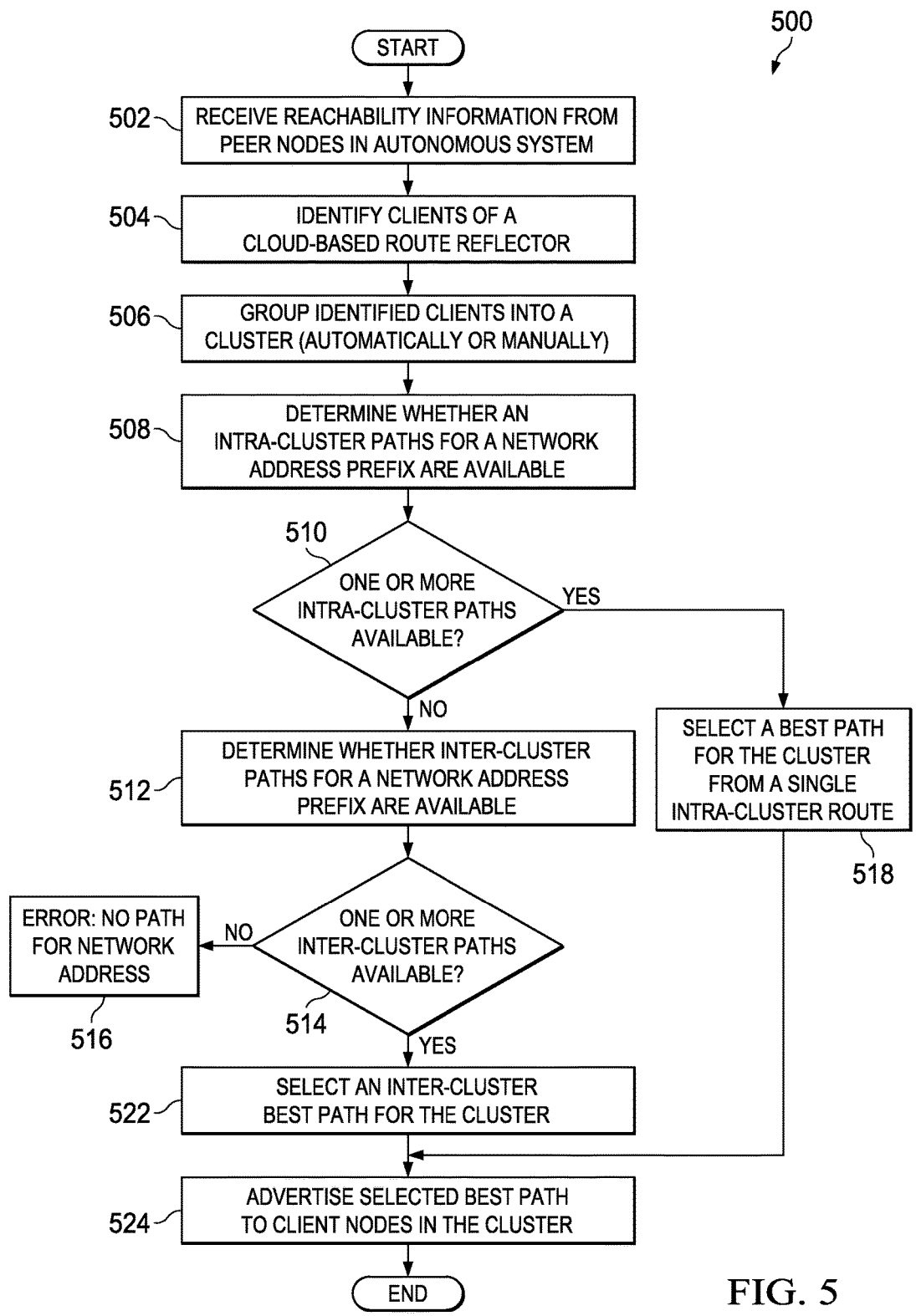
FIG. 5 is a simplified flowchart illustrating potential operations associated with a communication system according to at least one embodiment.

FIG. 5 is a flowchart of a possible flow 500 of operations that may be associated with embodiments described herein. In at least one embodiment, one or more sets of operations correspond to activities of FIG. 5. A cloud-based route reflector (e.g., 30, 330, 430) may utilize the one or more sets of operations. The cloud-based route reflector may comprise means, such as at least one processor (e.g., 39), for performing the operations. In an embodiment, at least some operations of flow 500 may be performed by optimized best path selection logic (e.g., 62) of a border gateway protocol optimized route reflector (e.g., 60) in the cloud-based route reflector.

At 502, a cloud-based route reflector (CBRR) receives reachability information from clients (e.g., edge routers, interior routers) in an autonomous system. In at least one embodiment, this reachability information can be received in the form of update messages in BGP sessions established between CBRR and each of the clients. The update messages can advertise Internet Protocol (IP) address prefixes of feasible routes being advertised in the update message. The network address prefixes are associated with a set of destinations external to the autonomous system.

At 504, CBRR can identify its clients in the autonomous system including the edge nodes and area border routers, for example. At 506, CBRR can group the identified clients into clusters. This cluster grouping may be done manually or automatically based on information received in existing protocols including, for example, a cluster identifier, which is a BGP attribute, and may be used by CBRR 330 to determine which nodes are in the same cluster. Edge nodes and area border routers are both BGP nodes and share the same cluster ID if they are in the same cluster. In other embodiments, clusters may correspond to areas (or levels) of IGP. In yet other embodiments, clusters may be manually configured.

Subsequent operations shown in FIG. 5 may be performed for a particular cluster and a particular network address prefix. However, such operations may be repeated to select a best path for each possible network address prefix for each cluster. At 508, CBRR determines whether intra-cluster paths for a network address prefix are available in the cluster. To make this determination, reachability information from BGP update messages can be evaluated to determine whether any clients (e.g., edge routers) in the cluster have advertised a path for the network address prefix.

At 510, a decision is made as to whether one or more intra-cluster paths are identified in the cluster. If one or more intra-cluster paths have been identified, then at 518, a single best path is selected for the cluster from the identified one or more intra-cluster paths. If multiple intra-cluster routes were identified, any suitable tie-breaking policies can be used to render the decision (e.g., IGP metric comparisons, lowest or highest edge router identifier (ID), edge router parameters, etc.).

If one or more intra-cluster paths are not available, as determined at 510, then at 512, CBRR may determine whether inter-cluster paths for the network address prefix are available in other clusters. To make this determination, reachability information from BGP update messages can be evaluated to determine whether any clients (e.g., edge routers) in other clusters have advertised a path for the network address prefix.

At 514, a decision is made as to whether one or more inter-cluster paths are identified. If one or more inter-cluster paths are identified, then at 522, a single best path is selected for the cluster from the identified one or more inter-cluster paths. In at least one embodiment, if multiple inter-cluster paths are identified, then CBRR can compare the identified inter-cluster paths using, for example, IGP metrics obtained from IGP advertisements. Generally, the inter-cluster path with the lowest cost or lowest number of hops may be determined to be the best path and selected by CBRR as the best path for the cluster.

Once a single best path (inter-cluster or intra-cluster) has been selected for the cluster, at 524, CBRR can advertise the best path to each client in the cluster. The advertisement can also include the network address prefix associated with the best path. In at least some embodiments, however, if the selected best path is an intra-cluster path, CBRR may not advertise the selected best path to the client from which it received the path.

In at least one embodiment, when BGP update messages are received by CBRR, best paths may be re-evaluated in some scenarios. For example, an update message from a client could include an IP address prefix being withdrawn because a route is deemed no longer reachable. In this scenario, any best path selections for the withdrawn IP address prefix may be recomputed to select a new valid (i.e., available) best path. In another example, an update message from a client could include a new IP address prefix because a route is now deemed reachable by the client. If the client is grouped in a cluster that currently uses an inter-cluster path as a best path, then the best path selection for the cluster may be recomputed to select the new intra-cluster path to be used by the nodes in the cluster.

Figure 6:
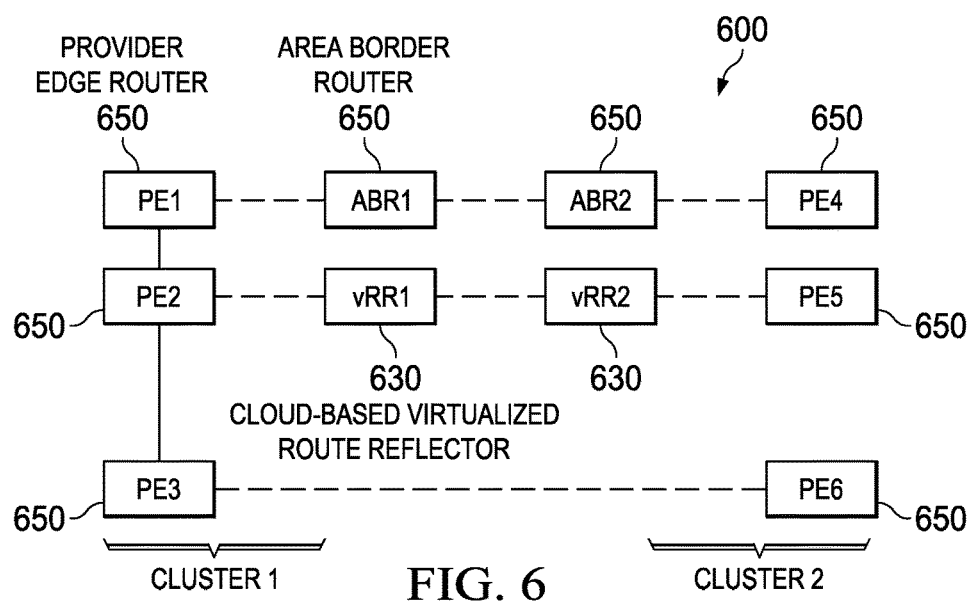
FIG. 6 is a simplified block diagram illustrating another possible configuration of a communication system according to at least one embodiment.

Turning FIG. 6, FIG. 6 is a block diagram illustrating another possible configuration of a communication system 600 for optimized best path selection in an autonomous system. Communication system 600 includes cloud-based virtualized route reflectors 630, area border routers 650, and provider edge routers 650. More particularly, communication system 600 includes cloud-based virtualized route reflector 1 (VRR1), a cloud-based virtualized route reflector 2 (VRR2), a provider edge router 1 (PE1), a provider edge router 2 (PE2), a provider edge router 3 (PE3), a provider edge router 4 (Pe4), a provider edge router 5 (PE5), a provider edge router 6 (PE6), an area border router 1 (ABR1), and an area border router 2 (ABR2). In some scenarios, each of the two clusters, cluster 1 and cluster 2, may have its own IGP area. VRR1 includes PE1, PE2, PE3, and ABR1 as its clients. VRR2 includes Pe4, Pe5, Pe6, and ABR2 as its clients. VRR1 and VRR2 run internal Border Gateway Protocol (iBGP) peering between them, without clients. Also, VRR1 and VRR2 can be virtual route reflectors running BGP-ORR with optimized best path selection logic, as they are not in the forwarding path. In at least one embodiment, VRR1 and VRR2 may run on a Linux based platform. ABR1 and ABR2 perform actual data path forwarding between clusters 1 and 2.

In the above scenario, VRR1 may perform several functions in accordance with at least one embodiment. First, VRR1 can identify PE1, PE2, PE3 and ABR1 as its clients and group them under a same policy (e.g., a cluster). Second, preference can be given to a client path. For example, VRR1 can automatically prefer a path received from PE1, PE2, or PE3 as its best path and announce the best path to all of VRR1's clients. If VRR1 has to choose between multiple client paths, VRR1 could either perform an IGP metrics comparison or choose a lowest router-id and select the best path. Third, in the absence of client (intra-cluster) paths, VRR1 can compare inter-cluster paths for a given prefix received from its iBGP VRRs. The comparison can use the IGP cost of inter-area subnet Link State Advertisements (LSAs) injected by ABRs of respective clusters and ABR1. VRR1 can decide the best path for its clients based on this comparison. The iBGP VRRs can include VRR2 and any other VRRs in other clusters. By way of example, in the above scenario, the IGP cost of inter-area LSAs may be injected by ABR1 and ABR2. For example, VRR1 can receive an inter-area LSA from ABR1 for PE4, PE5, and PE6. VRR1 can get the metric cost carried within the inter-area LSA (computed by ABR1) as an IGP metric cost (without adding the cost to reach ABR1) of a next hop of an inter-cluster path. Based on this information, VRR1 can decide the best path.

In at least one embodiment, the concepts presented herein may be implemented using Open Shortest Path First (OSPF) as an interior gateway protocol (IGP) within clusters. OSPF is an IGP for Internet Protocol (IP) networks based on the shortest path first on link state advertisement (LSA). OSPF peering between VRR1 and ABR1 can also be implemented. An OSPF downbit extension may be enabled, in at least one embodiment depending on the particular needs, to prevent leaking of inter-area LSAs. In at least one other embodiment, the concepts presented herein may be implemented using Intermediate System to Intermediate System (IS-IS), or any other suitable interior gateway protocol. IS-IS peering or BGP-Link State (BGP-LS) peering may be used. BGP-LS is a set of simple extensions to advertise topology information.

Variations and Implementations

Communications in a network environment are referred to herein as 'network traffic' or 'traffic', which may be inclusive of packets. A packet is a formatted unit of data, and can contain both control information (e.g., source and destination addresses, etc.) and data, which is also known as payload. Network traffic can be sent and received according to any suitable communication messaging protocols. Suitable communication messaging protocols can include a multi-layered scheme such as Open Systems Interconnection (OSI) model, or any derivations or variants thereof (e.g., transmission control protocol/IP (TCP/IP), user datagram protocol/IP (UDP/IP), etc.). The term 'data' as used herein, refers to any type of binary, numeric, voice, video, textual, or script data, or any type of source or object code, or any other suitable information in any appropriate format that may be communicated from one point to another in electronic devices and/or networks. Additionally, advertisements, messages, requests, responses, replies, queries, etc. are forms of network traffic, and therefore, may comprise packets.

As used herein, the term 'network element' is meant to encompass any of the aforementioned elements, as well as routers, switches, wireless access points (WAPs), gateways, bridges, loadbalancers, appliances, firewalls, servers, processors, modules (any of which may be physical or virtually implemented on physical hardware) or any other suitable device, component, element, proprietary appliance, or object that is operable to exchange information in a network environment. A network element may include any suitable hardware, software, components, modules, interfaces, or objects that facilitate the operations thereof. This may be inclusive of appropriate algorithms and communication protocols that allow for the effective exchange of data or information.

In at least one example implementation, nodes with optimized best path selection capabilities (e.g., node 30, cloud-based route reflector 330, cloud-based virtualized route reflector 630) include logic to achieve (or to foster) the activities as outlined herein. This could include the implementation of TLV elements to provide reachability information for nodes without forwarding capabilities. Note that in at least one example, each of these elements can have an internal structure (e.g., processors, memory elements, network interface cards, etc.) to facilitate some of the operations described herein. In some embodiments, these activities for selecting a best path may be executed externally to these elements, or included in some other network element to achieve this intended functionality. In at least one embodiment these nodes may include logic (or reciprocating logic) that can coordinate with other network elements in order to achieve the operations, as outlined herein. Furthermore, one or several devices may include any suitable algorithms, hardware, firmware, software, components, modules, interfaces, or objects that facilitate the operations thereof.

In certain example implementations, the optimized best path selection functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by one or more processors or other similar machine, instructions in software, hardware, firmware, or any combination thereof, etc.). This tangible media may be non-transitory in at least one embodiment. In some of these instances, one or more memory elements can store data used for the operations described herein. This includes the memory elements being able to store software, logic, code, and/or processor instructions that are executed to carry out the activities described herein. A processor can execute any type of instructions associated with the data to achieve the operations detailed herein. In one example, a processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements) can include memory for storing information to be used in achieving the optimized best path selection features, as outlined herein. Additionally, these network elements may include at least one processor that can execute software, an algorithm, or other instructions to perform the optimized best path selection operations, as disclosed herein. These network elements may further keep information, to be used in achieving the optimized best path selection activities as discussed herein, in any suitable memory element (random access memory (RAM), read only memory (ROM), EPROM, EEPROM, ASIC, etc.), software, hardware, or in any other suitable component, device, element, or object where appropriate and based on particular needs. Any of the memory items discussed herein (e.g., repositories, stores, databases, tables, caches, buffers, etc.) should be construed as being encompassed within the broad term 'memory element.' Similarly, any of the potential processing elements, modules, and machines described herein should be construed as being encompassed within the broad term 'processor.' Each of the network elements can also include suitable interfaces for receiving, transmitting, and/or otherwise communicating data or information in a network environment.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that the systems described herein are readily scalable and can accommodate a large number of components, as well as more complicated/sophisticated arrangements and configurations. Accordingly, the examples provided should not limit the scope or inhibit the broad teachings of the optimized best path selection features as potentially applied to a myriad of other architectures or implementations.

As used herein, unless expressly stated to the contrary, use of the phrase 'at least one of' refers to any combination of the named elements, conditions, or activities. For example, 'at least one of X, Y, and Z' is intended to mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular items (e.g., element, condition, module, activity, operation, etc.) they modify. Unless expressly stated to the contrary, the use of these terms is not intended to indicate any type of order, rank, importance, temporal sequence, or hierarchy of the modified item. For example, 'first X' and 'second X' are intended to designate two separate X elements that are not necessarily limited by any order, rank, importance, temporal sequence, or hierarchy of the two elements.

Note that in this Specification, references to "optimize," "optimization," "optimized", "optimal" and related terms are terms of art that refer to improvements in speed and/or efficiency of a specified outcome and do not purport to indicate that a process for achieving the specified outcome has achieved, or is capable of achieving, a perfectly speedy/perfectly efficient state.

It is also important to note that the activities, interactions, and operations shown and described herein illustrate only some of the possible optimized best path selection scenarios and patterns that may be executed by, or within, the nodes with optimized best path selection capabilities. Some of these activities, interactions, and/or operations may be deleted or removed where appropriate, or may be modified or changed considerably without departing from the scope of the present disclosure. In addition, a number of these activities, interactions, and/or operations have been described as being executed concurrently with, or in parallel to, one or more additional activities, interactions, and/or operations. However, the timing of these activities, interactions, and/or operations may be altered considerably. The preceding operational flows have been offered for purposes of example and discussion. Substantial flexibility is provided by nodes with optimized best path selection capabilities in that any suitable arrangements, chronologies, configurations, and timing mechanisms may be provided without departing from the teachings of the present disclosure. Additionally, these activities can be facilitated by various modules and/or components which can be suitably combined in any appropriate manner, or divided in any appropriate manner, and which may be based on particular configuration and/or provisioning needs.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although embodiments herein have been illustrated with reference to particular elements and protocols, these elements and protocols may be replaced by any suitable architecture, protocols, and/or processes that achieve the intended functionality of nodes with optimized best path selection capabilities as disclosed herein.

What is claimed is:

1. A method, comprising:
   identifying, by a cloud-based route reflector, a first cluster of nodes as clients of the cloud-based route reflector based on a first cluster identifier and a second cluster of nodes as clients of the cloud-based route reflector based on a second cluster identifier;
   configuring, by the cloud-based route reflector, the first cluster of nodes and the second cluster of nodes in an autonomous system;
   determining, by the cloud-based route reflector, whether any forwarding paths for a network address prefix are available in the first cluster of nodes;
   when one or more forwarding paths for a network address prefix are available in the first cluster of nodes:
      selecting, by the cloud-based route reflector, a first one of the one or more forwarding paths in the first cluster of nodes as a best forwarding path for the network address prefix;
      advertising, by the cloud-based route reflector, the best forwarding path to one or more nodes in the first cluster but not to any node in the first cluster that advertised, to the cloud-based route reflector, reachability information for the network address prefix;
   when a forwarding path for the network address prefix is unavailable in the first cluster of nodes:
      determining, by the cloud-based route reflector, that at least one forwarding path for the network address prefix is available in the second cluster of nodes;
      selecting, by the cloud-based route reflector, the at least one forwarding path as the best forwarding path; and
      advertising, by the cloud-based route reflector, the best forwarding path to one or more nodes in the second cluster,
   wherein the cloud-based route reflector is not in any forwarding path.

2. The method of claim 1, wherein the one or more forwarding paths are determined to be available in the first cluster based on reachability information received by the cloud-based route reflector from one or more edge nodes in the first cluster.

3. The method of claim 1,
   wherein the determining, by the cloud-based route reflector, that at least one forwarding path for the network address prefix is available in the second cluster of nodes, further comprises determining whether two or more forwarding paths for the network address prefix are available in at least the second cluster of nodes of the autonomous system; and
   selecting the best forwarding path from the two or more forwarding paths based, at least in part, on a comparison of metrics for the two or more forwarding paths.

4. The method of claim 3, wherein the metrics include one of a cost or a distance of each of the two or more forwarding paths.

5. The method of claim 3, further comprising:
   extracting the metrics from one or more protocol messages of an interior gateway protocol (IGP).

6. The method of claim 1, wherein one or more border gateway protocol (BGP) sessions are used by the cloud-based route reflector to advertise the best forwarding path to the one or more nodes in the first cluster of nodes.

7. The method of claim 1, wherein the cloud-based route reflector is a virtualized route reflector in a cloud network.

8. The method of claim 1, wherein the best forwarding path is selected from the one or more forwarding paths based on policy if the one or more forwarding paths include two or more forwarding paths.

9. A system, comprising:
a cloud-based route reflector including:
a communication interface configured to enable network communications;
one or more processors coupled with the communication interface; and
at least one non-transitory computer readable storage medium storing optimized best forwarding path selection logic that, when executed by the one or more processors:
identifies a first cluster of nodes as clients based on a first cluster identifier and a second cluster of nodes as clients based on a second cluster identifier;
configures the first cluster of nodes and the second cluster of nodes in an autonomous system;
determines whether any forwarding paths for a network address prefix are available in the first cluster of nodes;
when one or more forwarding paths for a network address prefix are available in the first cluster of nodes:
selects a first one of the one or more forwarding paths in the first cluster of nodes as a best forwarding path for the network address prefix;
advertises the best forwarding path to one or more nodes in the first cluster but not to any node in the first cluster that advertised, to the cloud-based route reflector, reachability information for the network address prefix,
when a forwarding path for the network address prefix is unavailable in the first cluster of nodes:
determines that at least one forwarding path for the network address prefix is available in the second cluster of nodes of the autonomous system;
selects the at least one forwarding path as the best forwarding path; and
advertises the best forwarding path to one or more nodes in the second cluster,
wherein the cloud-based route reflector is not in any forwarding path.

10. The system of claim 9, wherein the optimized best forwarding path selection logic, when executed by the one or more processors:
determines the one or more forwarding paths are available in the first cluster based on reachability information received by the cloud-based route reflector from one or more edge nodes in the first cluster.

11. The system of claim 9, wherein one or more border gateway protocol (BGP) sessions are used by the cloud-based route reflector to advertise the best forwarding path to the one or more nodes in the first cluster of nodes.

12. The system of claim 9, wherein the best forwarding path is selected from the one or more forwarding paths based on policy if the one or more forwarding paths include two or more forwarding paths.

13. The system of claim 9, wherein the best forwarding path is selected from the one or more forwarding paths based on policy if the one or more forwarding paths include two or more forwarding paths.

14. At least one non-transitory computer readable storage media comprising instructions stored thereon and when executed cause one or more processors to:
identify, by a cloud-based route reflector, a first duster of nodes as clients of the cloud- based route reflector based on a first duster identifier and a second duster of nodes as clients of the cloud-based route reflector based on a second duster identifier;
configure, by the cloud-based route reflector, the first duster of nodes and the second duster of nodes in an autonomous system;
determine, by the cloud-based route reflector, whether any forwarding paths for a network address prefix are available in the first duster of nodes;
when one or more forwarding paths for a network address prefix are available in the first duster of nodes:
select, by the cloud-based route reflector, a first one of the one or more forwarding paths in the first duster of nodes as a best forwarding path;
advertise, by the cloud-based route reflector, the best forwarding path to one or more nodes in the first duster but not to any node in the first duster that advertised, to the cloud-based route reflector, reachability information for the network address prefix;
when a forwarding path for the network address prefix is unavailable in the first duster of nodes:
determine that at least one forwarding path for the network address prefix is available in the second duster of nodes;
select the at least one forwarding path as the best forwarding path, and
advertise the best forwarding path to one or more nodes in the second duster,
wherein the cloud-based route reflector is not in any forwarding path.

15. The at least one computer readable storage media of claim 14, wherein the instructions when executed cause the one or more processors to:
determine the one or more forwarding paths are available in the first cluster based on reachability information received by the cloud-based route reflector from one or more edge nodes in the first cluster.

16. The at least one computer readable storage media of claim 14, wherein the instructions when executed cause the one or more processors to:
when no forwarding paths for the network address prefix are available in the first cluster, determine that two or more forwarding paths for the network address prefix are available in at least the second cluster of nodes of the autonomous system; and
select the best forwarding path from the two or more forwarding paths based, at least in part, on a comparison of metrics for the two or more forwarding paths.

17. The at least one computer readable storage media of claim 16, wherein the metrics include one of a cost or a distance of each of the two or more forwarding paths.

18. The at least one computer readable storage media of claim 17, wherein the instructions when executed cause the one or more processors to:
extract the metrics from one or more protocol messages of an interior gateway protocol (IGP).

19. The at least one computer readable storage media of claim 14, wherein the best forwarding path is selected from the one or more forwarding paths based on policy if the one or more forwarding paths include two or more forwarding paths.

20. The at least one computer readable storage media of claim 14, wherein the instructions when executed cause the one or more processors to:

advertise the best forwarding path to the one or more nodes in the first cluster of nodes using one or more border gateway protocol (BGP) sessions.

\* \* \* \* \*

UNITED STATES PATENT AND TRADEMARK OFFICE
CERTIFICATE OF CORRECTION

PATENT NO. : 10,097,449 B2  
APPLICATION NO. : 14/805300  
DATED : October 9, 2018  
INVENTOR(S) : Keyur Patel et al.

Page 1 of 1

It is certified that error appears in the above-identified patent and that said Letters Patent is hereby corrected as shown below:

In the Claims

Claim 14, Column 18, Line 4, replace "duster" with --cluster--
Claim 14, Column 18, Line 6, replace "first duster" with --first cluster--
Claim 14, Column 18, Line 6, replace "second duster" with --second cluster--
Claim 14, Column 18, Line 8, replace "duster" with --cluster--
Claim 14, Column 18, Line 10, replace "duster" with --cluster--
Claim 14, Column 18, Line 10, replace "second duster" with --second cluster--
Claim 14, Column 18, Line 14, replace "duster" with --cluster--
Claim 14, Column 18, Line 16, replace "duster" with --cluster--
Claim 14, Column 18, Line 18, replace "duster" with --cluster--
Claim 14, Column 18, Line 22, replace "duster" with --cluster--
Claim 14, Column 18, Line 22, replace "second duster" with --second cluster--
Claim 14, Column 18, Line 26, replace "duster" with --cluster--
Claim 14, Column 18, Line 29, replace "duster" with --cluster--
Claim 14, Column 18, Line 33, replace "duster" with --cluster--

Signed and Sealed this  
Twenty-ninth Day of January, 2019

Andrei Iancu  
*Director of the United States Patent and Trademark Office*